April 12, 1938.　　　M. S. MOORE　　　2,113,897

LEADER MECHANISM

Filed Dec. 24, 1936

M. S. Moore
INVENTOR

By Glascock Downing & Seebold
Attys.

Patented Apr. 12, 1938

2,113,897

UNITED STATES PATENT OFFICE 2,113,897

LOADER MECHANISM

Matthew Smith Moore, Malvern, England, assignor to The Mining Engineering Company Limited, Worcester, England, a British company Application December 24, 1936, Serial No. 117,617
In Great Britain January 14, 1936

2 Claims. (Cl. 198—199)

In patent specification No. 1,930,016 I have disclosed a loading machine for mines in which an andless conveyor extending transversely of the machine is adapted to receive material gathered by a loader bar and to discharge said material into a longwall or other conveyor along which the machine is moved. In an embodiment of said machine disclosed in my patent specification No. 2,072,009 an endless conveyor is used comprising a flexible belt and slats extending across said belt, and means are provided which co-operate with the slats for preventing the accumulation of dust between the return side of the belt and the machine frame. To that end the slats are given a suitable shape, the throw-off plate over which the material is discharged is made adjustable and a plate or shield is provided under the return side of the conveyor belt and the bottom plate of the machine, the slats acting as scrapers to prevent accumulation of material on this plate.

With some grades of coal it can happen that excess dust and small pieces adhere to the belt and fill the spaces between the slats thus impairing their grip on the larger pieces of coal. The objects of my present invention are to overcome this difficulty and to provide means for obtaining a good hold on the coal under very dusty coal conditions, and thus increasing the output of the conveyor.

With these objects in view, I form the slats, or some of them, with teeth projecting beyond the upper edge of the slats, said teeth preferably being made integral with the slats. In order that the throw-off plate may be kept close to the conveyor belt, I may provide in the edge of said plate adjacent the belt notches through which the teeth may pass. A plate or shield is arranged under the return side of the conveyor belt, and I form therein grooves corresponding in number and size to the teeth on the slats so that the teeth engage in said grooves while the slats scrape against the plate and no dust is allowed to accumulate under the belt.

An embodiment of this invention is illustrated by way of example in the accompanying drawing in which.

Figure 1:
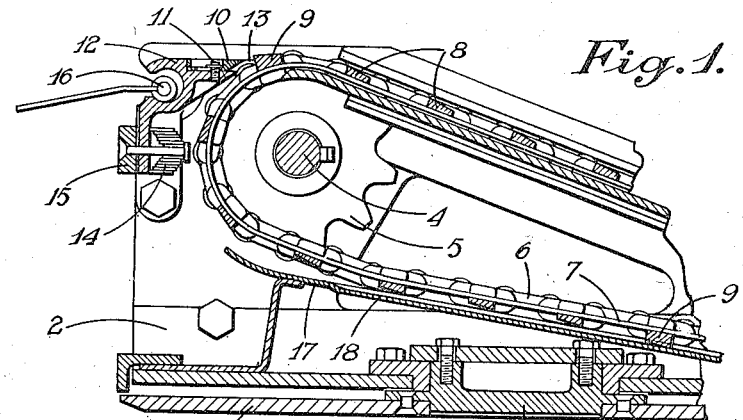
Fig. 1 is a sectional elevation on line I—I of Fig. 2, of the top portion of a loader structure according to my invention, Fig. 2 being a corresponding plan view.
Figure 2:
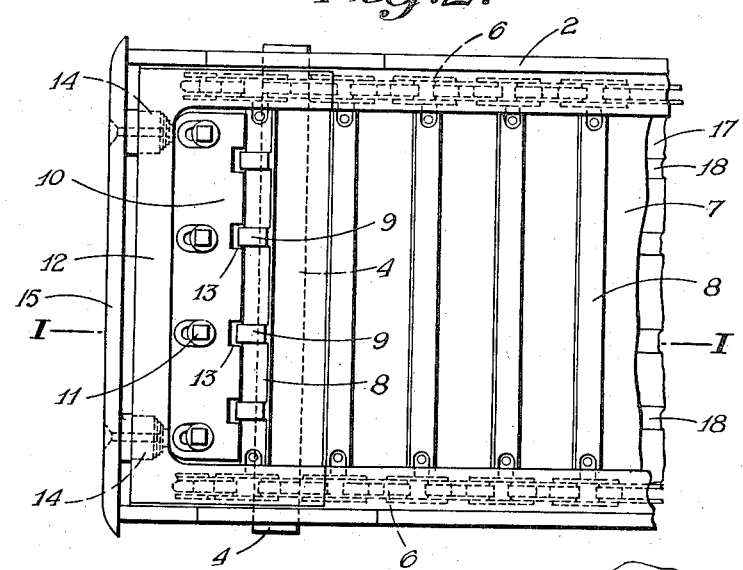
Figure 3:
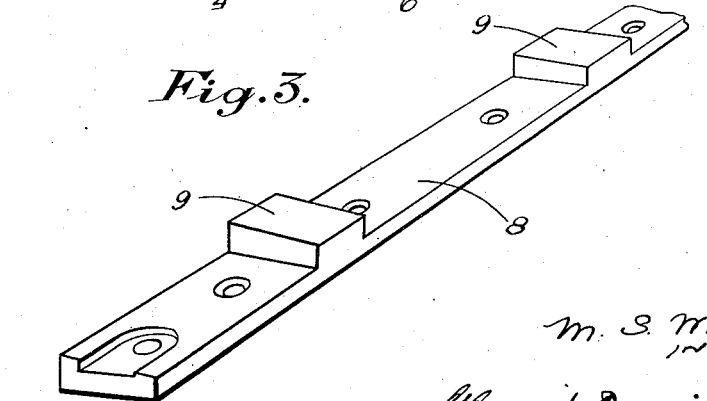
Fig. 3 is a perspective view illustrating a slat, on a larger scale.

In Figs. 1 and 2, 1 is the base plate of the machine on which the frame 2 of the loader structure is mounted by means of a pivot 3. In the frame 2 is journalled a shaft 4 carrying sprocket wheels 5 for driving the conveyor belt 6 by means of chains 7 to which the slats 8 are secured at their ends in a known manner.

In accordance with my invention some of the slats 8 are provided with outwardly projecting teeth 9 which are of sufficient height to grip pieces of coal, even if coal dust accumulated in front of the slat is flush with the front edge of the slat. In the example shown the slats 8 are made of iron bars of trapezoidal cross-section, and teeth 9 are integral with some of these slats which are placed at regular intervals along the belt. Preferably the teeth, like the slats themselves, have a trapezoidal cross-section, with an upstanding front edge of greater length than the rear edge.

10 is the throw-off plate adjustably secured by bolts 11 to the end piece 12 of the loader frame. In order that the teeth 9 may clear the plate, its edge adjacent the belt has notches 13 of a width and depth just sufficient to allow the teeth passing therethrough. The end piece 12 may advantageously consist of a bracket yieldingly held in position by springs 14 supported from a bar 15 secured to the loader frame, the arrangement being such that if a wedge-shaped piece of coal is forced under the plate 10, the bracket 12 can tilt about an axis 16, the springs 14 returning the bracket and plate to the position illustrated as soon as the piece has passed.

Under the return side of the belt 6 extends the inclined plate 17. As shown, this plate is provided with grooves 18 to accommodate the teeth 9 which the slats sweep along said plate, whereby accumulation of coal in the grooves 18 as well as on the plate 17 is efficiently prevented. It will be understood that where a curved plate is provided around the outer end of the loader belt as described in my aforesaid Patent No. 2,072,009, grooves may also be provided therein if desired.

The number of toothed slats on the belt and the number and shape of the teeth may of course be varied according to requirements.

I claim:

1. In a loader mechanism, more particularly for loading machines, the combination of a frame, a conveyor in said frame, said conveyor comprising an endless belt, slats across said belt, projecting teeth on said slots, a shield under the return side of said belt, said shield being grooved to accommodate said teeth.

2. In a loader mechanism, more particularly for loading machines, the combination of a frame, a conveyor in said frame, said conveyor comprising an endless belt having a rising portion and a substantially horizontal portion, slats on said belt and teeth on said slats, a throw-off plate yieldingly mounted at one end of said frame, said plate having a notched edge adjacent the higher portion of said belt, an inclined shield adjacent the return side of said belt, said shield being grooved to accommodate the teeth on said slats.

MATTHEW SMITH MOORE.

CERTIFICATE OF CORRECTION.

Patent No. 2,113,897. April 12, 1938.

MATTHEW SMITH MOORE.

It is hereby certified that the above numbered patent was erroneously issued to "The Mining Engineering Company Limited", as assignee of the entire interest in said invention, whereas said patent should have been issued to the inventor, Matthew Smith Moore and The Mining Engineering Company Limited, of Worcester, England, a British company, said company being assignee of one-half interest only in said invention, as shown by the record of assignments in this office; and that the said Letters Patent should be read with this correction therein that the same may conform to the record of the case in the Patent Office.

Signed and sealed this 9th day of August, A. D. 1938.

Leslie Frazer (Seal) Acting Commissioner of Patents.